(12) United States Patent
Smith

(10) Patent No.: US 8,028,540 B2
(45) Date of Patent: Oct. 4, 2011

(54) FOUR TERMINAL HERMETIC BUSHING FOR USE WITH SINGLE-PHASE ELECTRICAL SERVICE LINE AND THREE-WINDING MOTOR

(75) Inventor: Otto J. M. Smith, Berkeley, CA (US)

(73) Assignee: 123Phase Inc., Port Townsend, WA (US)

( * ) Notice: Subject to any disclaimer, the term of this patent is extended or adjusted under 35 U.S.C. 154(b) by 883 days.

(21) Appl. No.: 12/042,255

(22) Filed: Mar. 4, 2008

(65) Prior Publication Data
US 2009/0223235 A1    Sep. 10, 2009

(51) Int. Cl.
*F25B 31/00*    (2006.01)
(52) U.S. Cl. .......................................................... 62/505
(58) Field of Classification Search ............... 62/230, 62/126, 505; 310/71; 318/768
See application file for complete search history.

(56) References Cited

U.S. PATENT DOCUMENTS

| | | | | |
|---|---|---|---|---|
| 3,133,429 A | * | 5/1964 | Griffin | 417/313 |
| 6,331,925 B1 | * | 12/2001 | Loprete et al. | 361/22 |
| 7,553,136 B2 | * | 6/2009 | Ku et al. | 417/423.7 |

* cited by examiner

*Primary Examiner* — Melvin Jones
(74) *Attorney, Agent, or Firm* — Perkins Coie LLP

(57) ABSTRACT

A three-winding induction motor supplies shaft power to an air-conditioning or refrigeration compressor, where both motor and compressor are hermetically sealed, and the wall of the hermetic enclosure has an electrical bushing in the wall of the enclosure, which bushing has four electrical conductors to connect the motor stator windings internal in the enclosure to the external electrical circuits. Four conductors permit the six motor winding terminals for a three-winding induction motor to be connected in the unique semi-hexagon circuit to motor-run-capacitors and to a single-phase supply. A three-symmetrical-winding induction motor with the three windings in series and a single-phase supply connected across two of the windings in series. A circuit for use with a three-winding induction motor. A capacitor bank. An air-conditioning or refrigeration unit. A four-terminal hermetic bushing.

31 Claims, 6 Drawing Sheets

FOUR TERMINAL HERMETIC BUSHING FOR USE WITH SINGLE-PHASE ELECTRICAL SERVICE LINE AND THREE-WINDING MOTOR

FIELD OF THE INVENTION

The present invention pertains generally to an induction motor and more particularly to a three-winding hermetic induction motor which is connected to a single-phase power supply.

BACKGROUND OF THE INVENTION

The present invention is directed to a three-winding hermetic induction motor which is connected to a single-phase power supply. Traditionally, both single-phase and three-phase hermetic motors are connected by only three electrical conducting terminals to the electrical circuits external to the hermetic enclosure. For our unique connection of the six winding terminals of a three-winding motor to a single-phase supply using the Semi-Hex circuit, four conductors are provided and used in the hermetic bushing in the wall of the enclosure.

A Semi-Hexagon electrical motor circuit is disclosed in U.S. Pat. No. 5,300,870, issued Apr. 5, 1994, titled "Three-Phase Motor Control", to Otto J. M. Smith. In FIG. 1 of this patent, three motor windings are shown in the Semi-Hexagon (Semi-Hex) winding configuration and connection. This reference is hereby incorporated by reference.

The publication "High-Efficiency Single-Phase Motor", by Otto J. M. Smith was published in the IEEE Transactions on Energy Conversion, Vol. 7, No. 3, September 1992, ITCNE4 (ISSN 0885-8969) Pages 560-569. FIG. 2, page 561 is an illustration of an exemplary Semi-Hexagon circuit. This reference is hereby incorporated by reference.

The publication "High-Efficiency Single-Phase Motor", by Otto J. M. Smith, published in the Power Engineering Review, No. 9, Vol. 12, pages 47-48, September, 1992. (ISSN 0272-1724) provides a review of 91 SM 392-1 EC, T-EC September 1992. FIG. 1 on page 47 of this publication shows an illustration of an exemplary Semi-Hexagon circuit. This reference is hereby incorporated by reference.

SUMMARY

In one aspect, embodiments of the invention provide an hermetic bushing assembly and circuit comprising: a first power-supply terminal and a second power-supply terminal for coupling with an external two-wire single-phase power supply, the first power-supply terminal coupled to a first wire or electrical conductor and the second power-supply terminal coupled to a second wire or electrical conductor; four electrically conducting metal bars, each bar electrically insulated, and each bar having first and second electrical terminals located proximate each end of the bar, and further including; a first bushing bar to electrically connect said first wire of said power supply to an internal first terminal of a first winding of a three-winding induction motor; a second bushing bar to electrically connect said second wire of said power supply to a first terminal of a second winding of said three-winding induction motor; a third bushing bar to electrically connect to both a second terminal of said first winding of said three-winding induction motor and to a second terminal of said second winding of said three-winding induction motor; said first bushing bar also electrically connecting said first terminal of a third winding of said three-winding induction motor to said first wire; means to electrically connect a first run capacitor between said first wire and an external terminal of said third bushing bar; and a fourth bushing bar to electrically connect a second run capacitor between said second wire and a second terminal of said third winding of said three-winding induction motor.

In another aspect, embodiments of the invention provide a system comprising: a four-conductor hermetic bushing including a first bushing conductor, a second bushing conductor, a third bushing conductor, and a fourth bushing conductor, said bushings adapted for electrical connection to an internal three-winding electrical motor having first, second, and third motor windings and to an external two-wire single-phase power supply including a first wire and a second wire in operation; and two capacitors including a first capacitor and a second capacitor; wherein said first motor winding is electrically connected across said first and said second bushing conductors; said first capacitor is electrically connected between said first bushing conductor and said second bushing conductor; said second motor winding is electrically connected across said second and said third bushing conductors; said second capacitor is electrically connected between said third bushing conductor and said fourth bushing conductor; said third motor winding is electrically connected across said fourth bushing conductor and said first bushing conductor; said first wire of said power supply is electrically connected to said first bushing conductor; and said second wire of said power supply electrically connected to said third bushing conductor.

In yet another aspect, embodiments of the invention provide a capacitor bank to connect an external two-wire single-phase power supply having a first wire and a second wire, to a three-winding motor having first, second, and third motor two-terminal windings, comprising: a first capacitor; and a second capacitor; said first and said second motor windings are adapted to be connected electrically in series between said first wire of said external power supply and said second wire of said external power supply; means for electrically coupling a first terminal of said first motor winding to the said first wire; means for electrically coupling a first terminal of said second motor winding to the said second wire; means for electrically coupling a second terminal of said first winding to the second terminal of the said second winding; means for electrically coupling a first terminal of the third motor winding to said first wire; means for electrically coupling a first terminal of said first motor winding to the said first wire; means for electrically coupling a first terminal of said second motor winding to the said second wire; means for electrically coupling a second terminal of said first winding to the second terminal of the said second winding; said first capacitor is adapted to be connected between said first wire and a second terminal of the first motor winding; said second capacitor is adapted to be connected between the second terminal of the third motor winding and the second wire of the power supply; and said three-winding motor being adapted for placement inside an hermetic enclosure which also contains refrigerant vapor, and said capacitors being disposed outside of the said hermetic enclosure.

In still another aspect, embodiments of the invention provide a refrigeration or air-conditioning unit comprising: a refrigerant compressor having a rotatable compressor shaft; a three-winding electrical induction motor having a motor shaft and mechanically coupled with said compressor shaft for driving said refrigerant compressor; an input power port having a first input terminal for coupling with and receiving power from an external power supply single-phase electrical first wire line and a second input terminal for coupling with and receiving power from an external power supply single-phase electrical second wire line; a four-terminal hermetic bushing for coupling with said single-phase first and second wire lines and said three-winding motor; and first and second motor-run capacitors coupled with the hermetic bushing and with at least one of the input power port line wires.

In even still another aspect, embodiments of the invention provide a circuit for use with an air-conditioning compressor motor, comprising: a first power-supply terminal and a second power-supply terminal for coupling with an external two-wire single-phase power supply, the first power-supply terminal coupled to a first wire or electrical conductor and the second power-supply terminal coupled to a second wire or electrical conductor; a first connector node to electrically connect said first wire of said power supply to a first terminal of a first winding of a three-winding induction motor; a second connector node to electrically connect said second wire of said power supply to a first terminal of a second winding of said three-winding induction motor; a third connector node to electrically connect to both a second terminal of said first winding of said three-winding induction motor and to a second terminal of said second winding of said three-winding induction motor; said first connector node also electrically connecting a first terminal of a third winding of said three-winding induction motor to said first wire; an electrically conductive member to electrically connect a first run capacitor between said first wire and said second terminal of said first winding of said three-winding induction motor; and a fourth connector node to electrically connect a second run capacitor between said second wire and a second terminal of said third winding of said three-winding induction motor.

In still another aspect, embodiments of the invention provide for methods for operating a three-winding electrical induction motor using a single-phase two-wire power source.

In still an additional aspect, embodiments of the invention provide for an efficient and energy saving system and method for operating an electrical motor, refrigeration compressor, refrigeration unit, and air-conditioning system.

DETAILED DESCRIPTION OF EXEMPLARY EMBODIMENTS OF THE INVENTION

The present invention is directed to a three-winding hermetic induction motor which is connected to a single-phase power supply. Traditionally, both single-phase and three-phase hermetic motors are connected by only three electrical conducting terminals to the electrical circuits external to the hermetic enclosure. The invention provides unique connection of the six winding terminals of a three-winding motor to a single-phase supply using the Semi-Hexagon circuit, whereby four conductors are provided and used in the hermetic bushing in the wall or partition of the enclosure.

In one aspect, a hermetic bushing with four electrically insulated electrically conducting metal bars with terminals, electrically connects the six terminals of the stator winding of a three-winding motor to a single-phase power supply and to two continuous-duty motor-run capacitors. This system operates a three-phase or three-winding motor at low cost and high efficiency directly from a single-phase power supply. No transformer is used. No inverter or converter is used.

In another aspect, a capacitor bank of two continuous-duty motor-run capacitors electrically connects a single-phase power supply and two terminals of a four-terminal hermetic bushing, and electrically connects three terminals of the stator motor winding which has three symmetrical windings.

In still another aspect, a three-winding electrical motor has electrical connections to a four-terminal hermetic bushing, said bushing is also electrically connected to motor-run capacitors and to a single-phase power supply.

These structures and methods provide a low-cost high-efficiency method of operating a high-efficiency three-winding three-phase motor directly from a single-phase power supply, without electronics, without a special transformer, without either static or rotary converters, and without variable frequency inverters.

Figure 1:
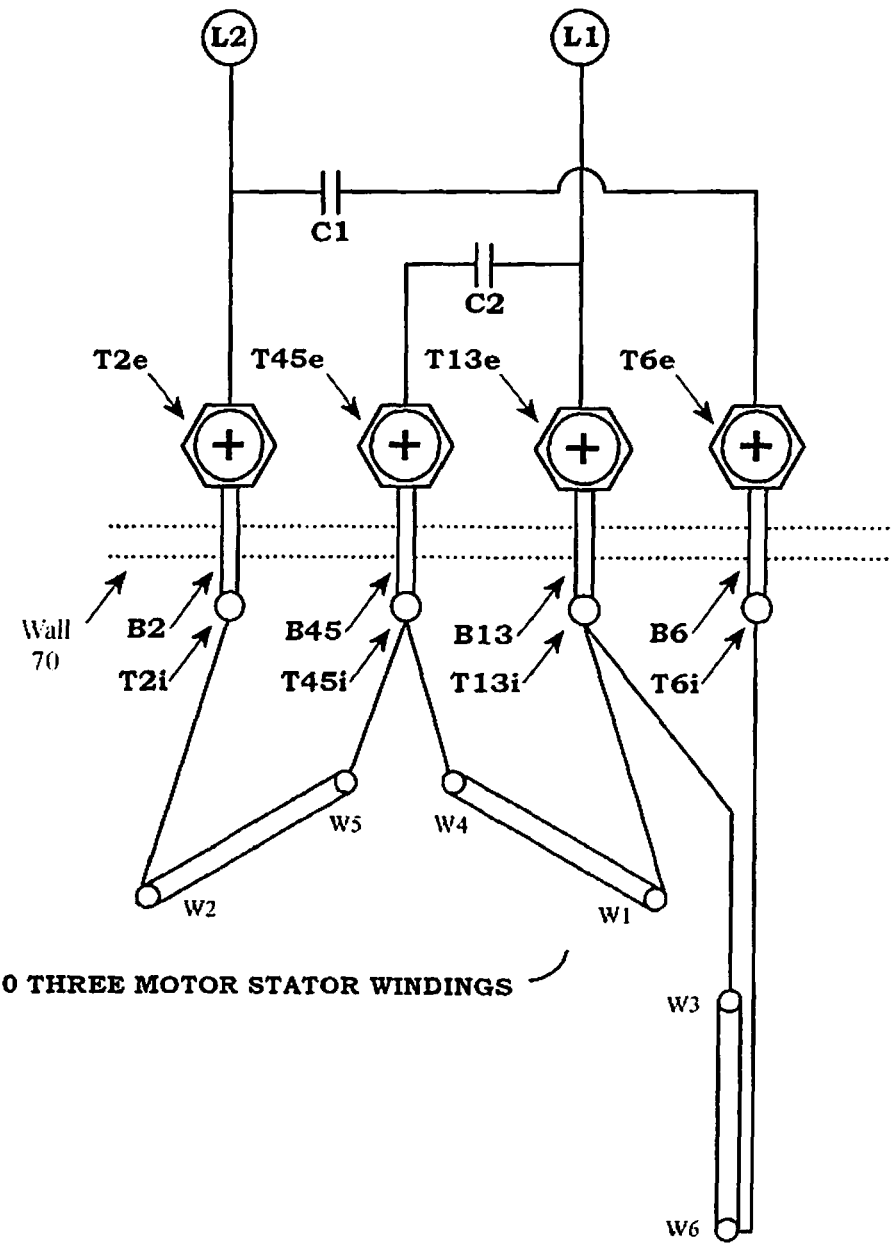
FIG. 1 is an illustration showing an exemplary embodiment of a complete system of a four-electrical-terminal hermetic bushing, single-phase power, two motor-run capacitors, internal motor stator windings and internal motor shaft driving the refrigerant compressor.
Figure 1:
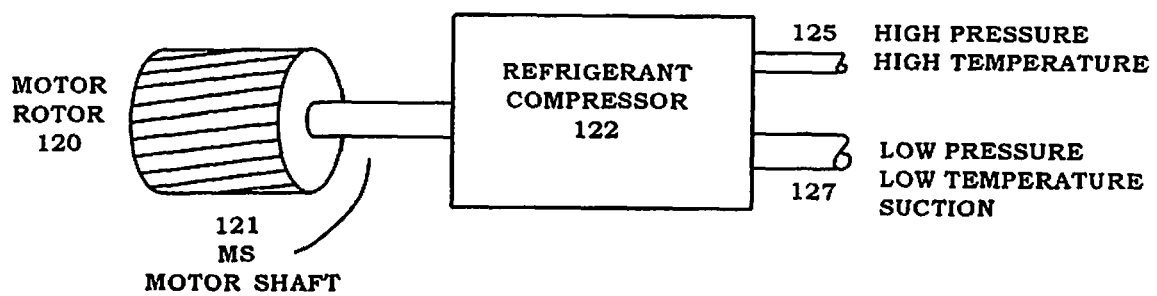

Turning now to the drawings, FIG. 1 shows an exemplary single-phase electrical power supply with terminals L1 and L2 electrically connected to two terminals of an hermetic bushing T13e and T2e respectively. A motor-run capacitor C1 connects L2 to the bushing terminal T6e. A second motor run capacitor C2 connects L1 to the bushing terminal T45e. This four-terminal bushing is mounted in the wall or other structure 70 which separates the power supply and the capacitors in the external ambient air which is outside from the pressurized hermetic enclosure 72 containing the three motor stator windings 110 and the motor rotor 120, the motor shaft 121, and the refrigerant compressor 122. These components 110, 120, 121, and 122 are inside the hermetic enclosure which is advantageously full or substantially full of practically pure refrigerant vapor and a small amount of lubricant for the compressor. Outside of the hermetic enclosure are two pipes. Pipe 125 or other conduit contains the output of the compressor which is high pressure high temperature refrigerant vapor. Pipe or other conduit 127 contains the low pressure low temperature refrigerant vapor which is the suction pipe for the compressor. This is an example of a complete system of four-terminal hermetic bushing, single-phase power, run capacitors, internal motor stator windings and internal motor shaft driving the refrigerant compressor.

Figure 2:
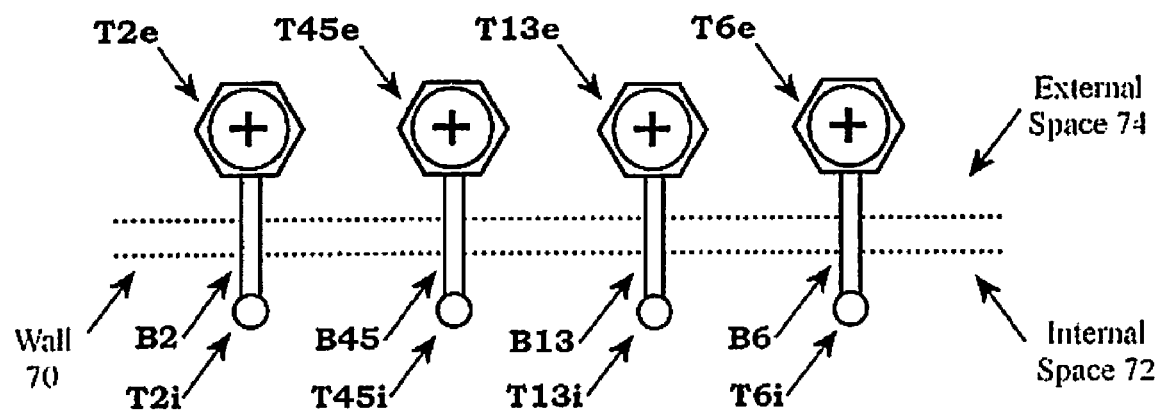
FIG. 2 is an illustration showing an exemplary embodiment of a four-terminal hermetically-sealed bushing.

FIG. 2 is an illustration of an exemplary four-conductor four-terminal bushing hermetically sealed in the wall 70 of a refrigerant enclosure. The enclosure has an internal space 72 with refrigerant vapor. An external space 74 is the space external to the enclosure which is usually ambient air. The bushing has a first insulated conducting bar B2, a second insulated conducting bar B45, a third insulated conducting bar B13, and a fourth insulated conducting bar B6. This assembly is advantageously mounted in the wall 70 between the inside space 72 and the external space 74. The inside space 72 contains the refrigerant fluid. The external space 74 has ambient air or other suitable gas(es).

Electrical terminals T2*i*, T45*i*, T13*i*, and T6*i* are electrically connected to the internal ends of the bars B2, B45, B13, and B6 respectively in FIG. 2.

Electrical terminals T2*e*, T45*e*, T13*e*, and T6*e* are electrically connected to the external ends of the bars B2, B45, B13, and B6 respectively in FIG. 2.

Multiple-terminal bushings are manufactured by the Vitrus, Inc., 881 Main St., Pawtucket, R.I. The external terminals T2*e*, T45*e*, T13*e* and T6*e* may advantageously have electrically-conducting threaded screwdriver bolts or other fasteners or fastening means which can clamp electrical spades on conductors, not shown.

Figure 3:
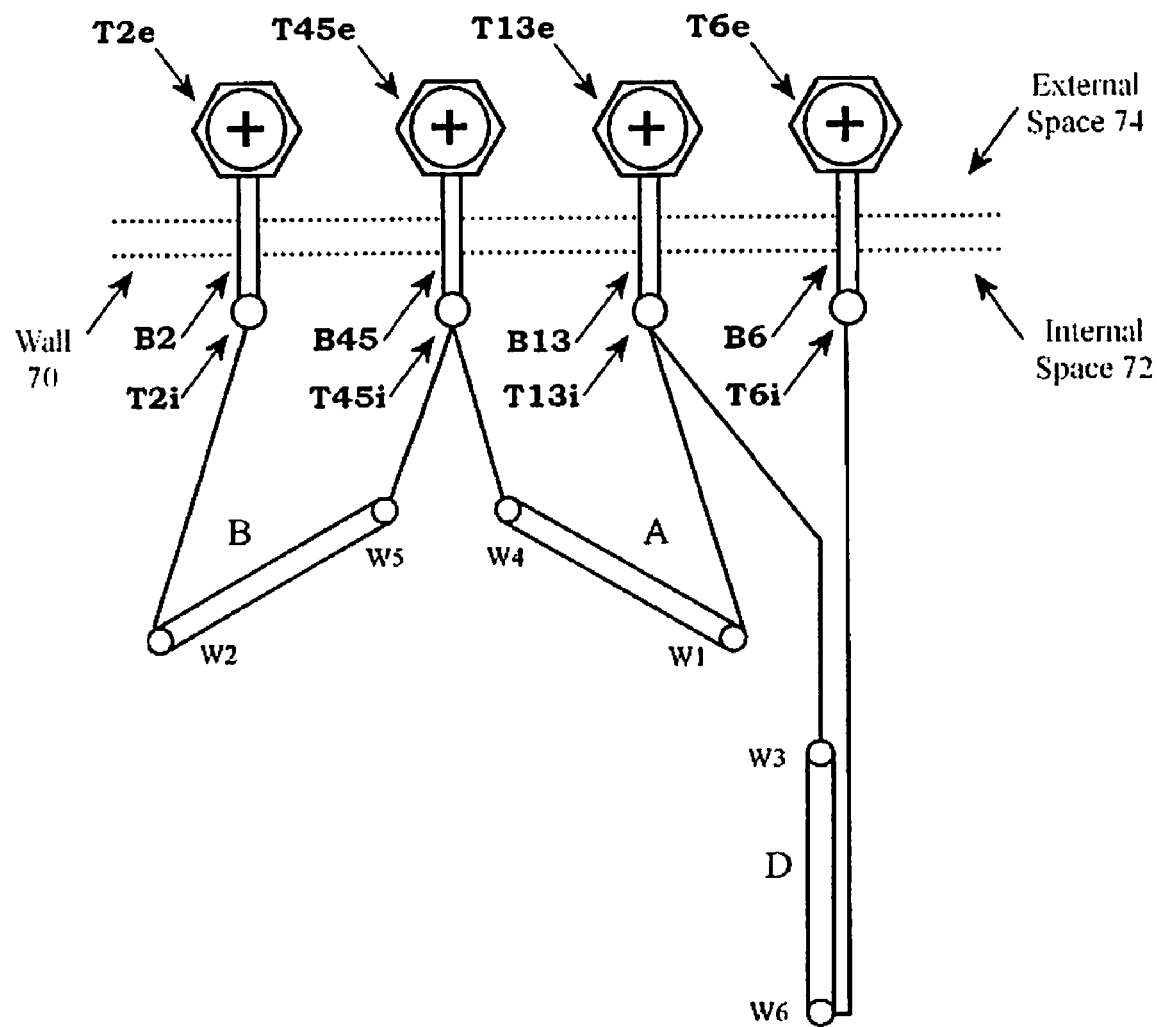
FIG. 3 is an illustration showing an exemplary embodiment of an internal motor stator windings with a Semi-Hexagon electrical connection.

FIG. 3 shows three motor stator winding of the motor enclosed in the inside space 72. Phase winding A has two terminals with the standard notations of W1 and W4. Phase winding B has two terminals with the standard notations of W2 and W5. Phase winding D has two terminals with the standard notations of W3 and W6. Internally, Terminal W2 is electrically connected to Terminal T2*i* of Bar B2. Terminal W6 is electrically connected to Terminal T6*i* of Bar B6. Terminals W1 and W3 are both electrically connected to Terminal T13*i* of Bar B13. Terminals W4 and W5 are both electrically connected to Terminal T45*i* of Bar B45. These connections create the Semi-Hex circuit of the three motor stator windings according to one embodiment of the invention. The structural geometry of the symmetrically-wound three stator windings makes the voltages induced in each of the three windings by the rotating flux in the air-gap of the motor have time phases which are 120 degrees from each other. With a 230-volt single-phase supply, the voltage across winding A is 133 volts from W1 to W4. The voltage across winding B is 133 volts from W2 to W5, lagging the voltage in winding A by 120 degrees. The voltage across winding D is 133 volts from W3 to W6, lagging the voltage from W2 to W5 by 120 degrees.

Figure 4:
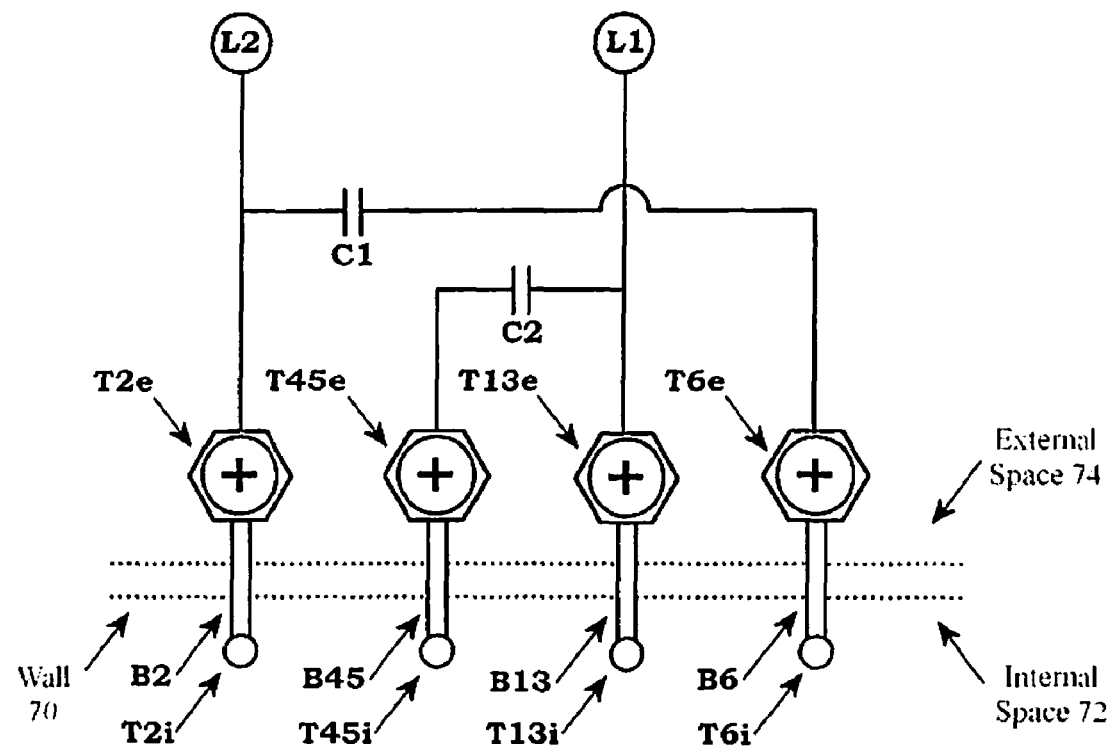
FIG. 4 is an illustration showing an exemplary embodiment of an external electrical connection of the single-phase power to the bushing external terminals and to two run capacitors.

FIG. 4 shows an exemplary embodiment in which the external single-phase power supply is between the terminals marked L1 and L2. The power line L2 is electrically connected to the external bushing terminal T2*e*. The voltage on L2 is applied to the terminals T2*e*, bar B2, and terminals T2*i* and winding terminal W2 of phase-winding B in FIG. 3. The power line L1 is electrically connected to the external bushing terminal T13*e*. The voltage on L1 is applied to the terminals T13*e*, bar B13, terminal T13*i*, and winding terminals W1 and W3 in FIG. 3. Run capacitor C1 is electrically connected between bushing terminal T2*e* and T6*e*. Run capacitor C2 is electrically connected between bushing terminal T45*e* and bushing terminal T13*e*. Capacitor C1 carries current from line terminal L2 to bushing terminal T6*e*. Capacitor C2 carries current from line terminal L1 to bushing terminal T45*e*.

Figure 5:
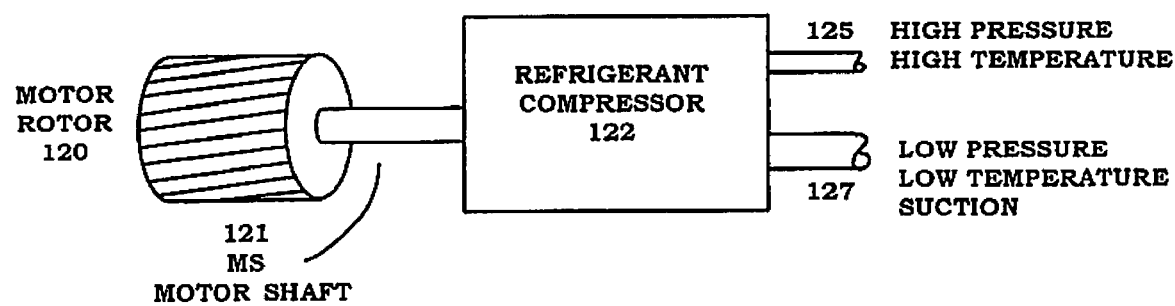
FIG. 5 is an illustration showing an exemplary embodiment of a motor rotor and motor shaft driving the refrigerant compressor.

FIG. 5 shows the motor rotor 120, motor shaft 121, and refrigerant compressor 122. The compressor can be either a reciprocating compressor, or a scroll compressor, like a turbine, or to any type of compressor. The compressor delivers a compressed refrigerant fluid, which is hot due to the compression. This hot fluid exits the compressor and exits the hermetic enclosure in the pipe 125 and goes to useful components not shown as are known in the art. After being used in these components, the exhausted fluid at low pressure and low temperature is sucked or taken up into the pipe 127 and is sucked into the hermetic enclosure and sucked into the input of the compressor.

In a typical air conditioner, the not-shown useful components include a hot radiator, an expansion valve, and a cold radiator. In a cooling air conditioner, the thermodynamic useful cooling power is the heat flow from the cooled room into the cold radiator. This heat flow is typically measured in British Thermal Units per Hour, abbreviated BTU/Hour. An example will be given later of a nominal rated cooling of 60,000 BTU per Hour.

In a typical heat pump, in the heating mode, the not shown useful hot radiator component is delivering heat power from the refrigerant into the exterior of the hot radiator. This thermal power is also measured in BTU per Hour, and these values are larger than the rated cooling power.

FIG. 5 is the motor rotor and motor shaft driving the refrigerant compressor. Our interest in FIG. 5 is the electrical watts delivered by the motor rotor and shaft into the mechanical compressor.

Figure 6:
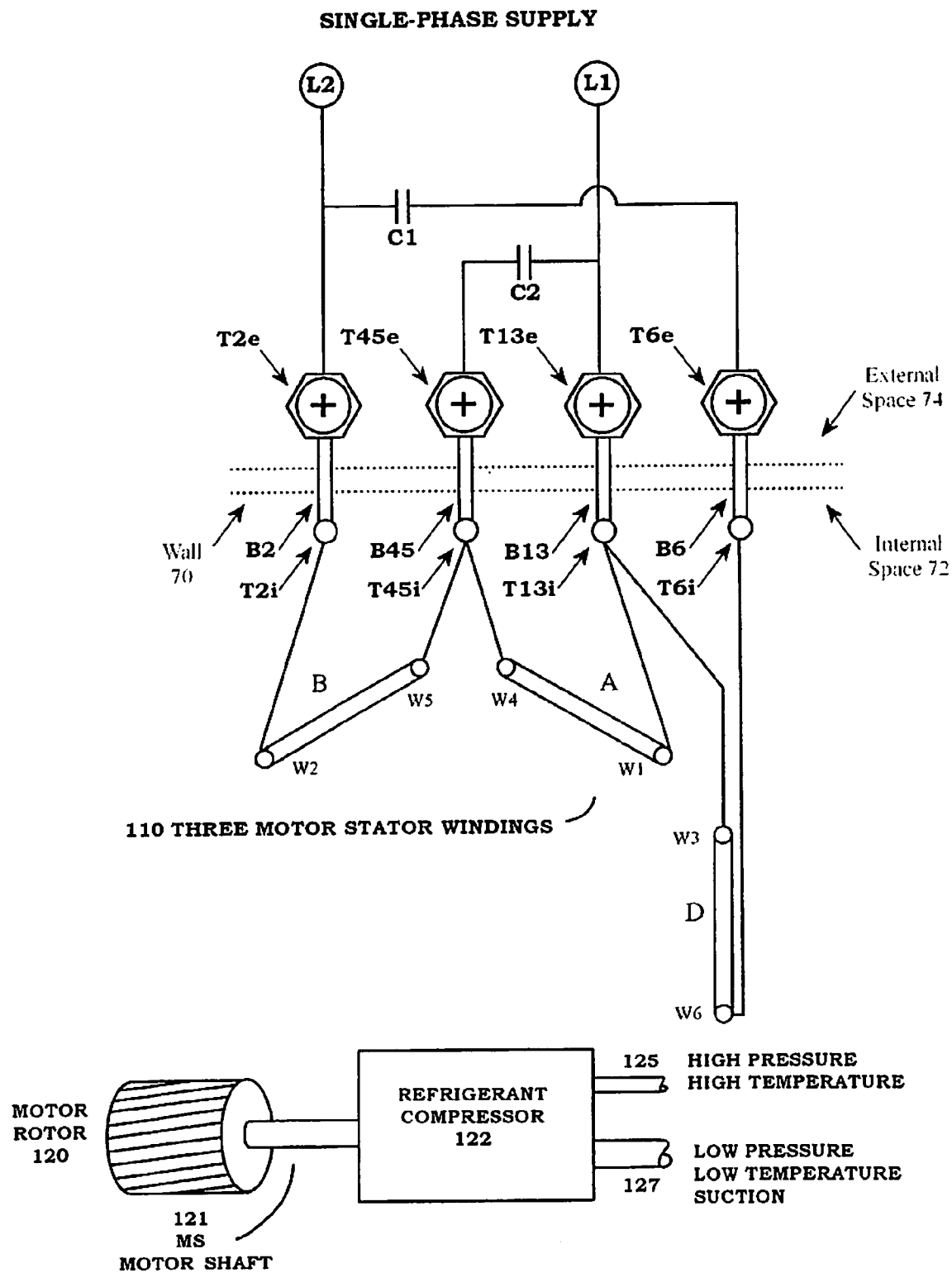
FIG. 6 is an illustration showing an exemplary embodiment of a complete system of the combination of subsystems illustrated in FIG. 2, FIG. 3, FIG. 4, and FIG. 5.

FIG. 6 shows the entire system of concern of the combination of hermetic bushing in FIG. 2, Semi-Hex stator winding in FIG. 3, electrical supply and run capacitors in FIG. 4 and motor rotor in FIG. 5.

In the embodiment of FIG. 6, the voltage across capacitor C1 is the voltage between L2 and winding terminal W6, which in one embodiment is about 266 volts when the power supply is 230 volts between L1 and L2 and the motor rotor is rotating. Voltages described here are exemplary to show operation of a particular embodiment but are not limiting of embodiments of the invention. This voltage across the capacitor C1 causes the capacitor to inject into winding D with terminal W6 a current of magnitude equal to the rated full-load current of the motor through T6*e*, bar B6, and terminal T6*i*. The phase of this injected current into winding D lags the voltage phasor drop from W6 to W3 by a design current of approximately 30 degrees.

The voltage across capacitor C2 is the voltage between L1 and terminal T45*i*, which is 133 volts when the power supply is 230 volts between L1 and L2 and the motor is running. This voltage across the capacitor C2 causes the capacitor to inject into terminal T45*i* a current equal to the rated full-load current of the motor or a design current through T45*e*, bar B45, and terminal T45*i*. This current divides into two equal components 120-degrees apart, one component being injected into winding terminal W4 and the other component being injected into winding terminal W5.

With the capacitors shown, the voltages induced in the three windings by the rotating air-gap flux have the voltage phase sequence of W1-W2-W3. The voltage W1-W4 leads in phase by 120 degrees the voltage from W2-W5. The voltage W2-W5 leads in phase by 120 degrees the voltage from W3-W6. The voltage W3-W6 leads in phase by 120 degrees the voltage from W1-W4.

This circuit and these voltage relationships are named the Semi-Hexagon circuit, or Semi-Hex circuit. This circuit makes possible the two-wire single-phase power connection to the three-winding motor. Three-winding motors are more efficient than single-phase motors, so this method reduces electricity costs and conserves energy resources.

The exemplary complete system in FIG. 6 has been slightly modified and reproduced in the exemplary embodiment of FIG. 1 with many of the important features.

Returning again to the embodiment of FIG. 1, operation of the system is further described. FIG. 1 shows the three motor windings with terminals W1 and W4 for a first phase, terminals W2 and W5 for a second phase, and terminals W3 and W6 for a third phase. Inside of the hermetic enclosure, Terminals W1 and W3 are connected together to form a new terminal T13*i*. Inside of the hermetic enclosure, Terminals W4 and W5 are connected together to form a new terminal T45*i*. A bushing conductor, such as for example a bushing conductor made by Vitrus, Inc., connects Terminal T13*i* inside of the enclosure to terminal T13*e* outside of the enclosure. Another bushing conductor connects Terminal T45*i* inside of the enclosure to terminal T45e outside of the enclosure. A third bushing conductor connects winding terminal W2 inside of the enclosure to terminal T2e outside of and external to the enclosure. A fourth bushing conductor connects winding terminal W6 inside of the enclosure to terminal T6e outside of and external to the enclosure.

Outside of the enclosure, a motor run capacitor 110 (C1) is electrically connected between terminal T6e and terminal T2e. A second motor run capacitor 112 (C2) is electrically connected between terminal T13e and terminal T45e.

In one embodiment, the 230-volt single-phase power supply is provided by meters between power line L1 and power line L2 and fuses in series in power lines L1 and L2. When an ON switch is closed, L2 is electrically connected to T2e, and L1 is electrically connected to T13e.

Capacitor 110 (C1) injects into winding terminal W6 the rated nameplate current (RLA) lagging the voltage between W6 and W3 by approximately 30 degrees. Capacitor 112 (C2) injects into the "pseudo-neutral" terminal T45e the same magnitude of current (|RLA|) which lags the voltage from T45e to the center-tap of the power-supply by approximately 30 degrees. When the compressor is loaded to its rated Btu-per-kWHour, the winding currents will be approximately balanced and equal in magnitudes. These relationships for conventional configurations have been reported in many publications and are not further described here.

It is within the scope of this invention and contemplated by at least one non-limiting embodiment of the invention for the two capacitors C1 and C2 to be assembled and mounted inside of a single can with four terminals, to save costs in manufacturing.

It will be appreciated that in one of the described embodiments, an hermetic bushing with four electrical conducting metal bars (B2, B6, B13, B45) has been described, wherein each bar electrically insulated, each bar with electrical terminals at each end, (T2i, T2e, T6i, T6e, T13i, T13e, T45i, T45e), a single-phase power supply between a first wire (L1) and a second wire (L2), a three-winding induction motor (110), each winding having two electrical terminals, first bushing bar means (B13) to electrically connect said first wire (L1) of said power supply to a first terminal (W1) of a first winding. It may also include second bushing bar means (B2) to electrically connect said second wire (L2) of said power supply to a first terminal (W2) of the second winding, third bushing bar means (B45) to electrically connect said first wire (L1) to both a second terminal (W4) of said first winding and to a second terminal (W5) of said second winding, first bushing bar means (B13) also electrically connects the first terminal (W3) of a third winding to the first wire (L1), and means to electrically connect a first run capacitor (C2) between said first wire (L1) and second terminal (W4) of first winding, and a fourth bushing bar means (B6) to electrically connect a second run capacitor (C1) between said second wire (L2) and the second terminal (W6) of the third winding.

In may be appreciated in light of the foregoing that there is disclosed a hermetic bushing with four electrical conducting metal bars, each bar electrically insulated, each bar with electrical terminals at each end, a single-phase power supply between a first wire and a second wire, a three-winding induction motor, each winding having two electrical terminals, first bushing bar means to electrically connect the first wire of the power supply to a first terminal of a first winding, second bushing bar means to electrically connect the second wire of the power supply to a first terminal of the second winding, third bushing bar means to electrically connect the first wire to both a second terminal of the first winding and to a second terminal of the second winding, first bushing bar means also electrically connects the first terminal of a third winding to the first wire, means to electrically connect a first run capacitor (C2) between the first wire and second terminal of first winding, and a fourth bushing bar means to electrically connect a second run capacitor (C1) between the second wire and the second terminal of the third winding.

In may be further appreciated in light of the foregoing that there is disclosed a three-winding electrical motor, a two-wire single-phase power supply, a four-conductor hermetic bushing, and two continuous-duty capacitors, wherein a first motor winding is electrically connected across the first and second bushing conductors, and a first capacitor is also electrically connected between the first bushing conductor and the second bushing conductor, a second motor winding is electrically connected across the second and third bushing conductors, and a second capacitor is electrically connected between the third bushing conductor and a fourth bushing conductor, a third motor winding is electrically connected across the fourth bushing conductor and the first bushing conductor, a first wire of the power supply electrically connected to the first bushing conductor, and the second wire of the power supply electrically connected to the said third bushing conductor.

In may be further appreciated in light of the foregoing that there is disclosed a capacitor bank to connect a two-wire single-phase power supply to a three-winding motor wherein first and second motor windings are connected electrically in series between the first wire of the power supply and the second wire of the power supply, a first capacitor is connected between the first wire and a first terminal of the third motor winding, the second terminal of the third motor winding is connected to the second wire, a first terminal of first motor winding is connected to the first wire, a first terminal of the second motor winding is connected to the second wire, a second terminal of the first winding is connected to the second terminal of the second winding, a second capacitor is connected between the second terminal of the second winding and the second wire of the power supply, the three-winding motor being inside an hermetic enclosure which also contains refrigerant vapor, and the capacitors being outside of the hermetic enclosure.

An example of this inventive system using the inventive bushing is now described so that some of its advantages may be readily appreciated. This example is for a power supply of 230 volts and a Bristol nominal 60,000 Btu/Hour compressor with capacitor C1 of 150 microfarads and capacitor C2 of 300 microfarads. The voltage across capacitor C1 is 266 volts, and the voltage across capacitor C2 is 133 volts. The winding average current is 14.6 amperes, and the single-phase input power from the electrical power company is 5,060 watts. The power-line current is 27 amperes, leading the voltage by a phasor angle of +35.9 degrees, which is an 81% current power-factor. This system is advantageous because four terminals in the bushing is the minimum number which matches the needs of the Semi-Hexagon circuit.

A bushing with only three terminals cannot connect the single-phase line to the three motor windings. A bushing with six terminals is too large to be economical or practical. This inventive structure, circuit, and method use of the exemplary bushing in FIG. 2 and FIG. 6 with four terminals is unique, economical, and saves energy with the high efficiency of the three-winding motor compared to the low efficiency of a single-phase motor.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the technology is not intended to be exhaustive or to limit the technology to the precise form disclosed above. While specific embodiments of, and examples for, the technology are described above for illustrative purposes, various equivalent modifications are possible within the scope of the technology, as those skilled in the relevant art will recognize.

The teachings of the technology provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the technology in light of the above Detailed Description. While the above description describes certain embodiments of the technology, and describes the best mode contemplated, no matter how detailed the above appears in text, the technology can be practiced in many ways. Details of the data collection and processing system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless the above Detailed Description section explicitly defines such terms. Accordingly, the actual scope of the technology encompasses not only the disclosed embodiments, but also all equivalent ways of practicing or implementing the technology under the claims.

While certain aspects of the technology are presented below in certain claim forms, the inventors contemplate the various aspects of the technology in any number of claim forms. For example, while only one aspect of the technology is recited as embodied in a method, other aspects may likewise be embodied in a computer-readable medium. Accordingly, the inventors reserve the right to add additional claims after filing the application to pursue such additional claim forms for other aspects of the technology.

I claim:

1. A hermetic bushing assembly and circuit comprising:
a first power-supply terminal and a second power-supply terminal for coupling with an external two-wire single-phase power supply, the first power-supply terminal coupled to a first wire or electrical conductor and the second power-supply terminal coupled to a second wire or electrical conductor;
four electrically conducting metal bars, each bar electrically insulated, and each bar having first and second electrical terminals located proximate each end of the bar, and further including;
a first bushing bar to electrically connect said first wire of said power supply to a first terminal of a first winding of a three-winding induction motor;
a second bushing bar to electrically connect said second wire of said power supply to a first terminal of a second winding of said three-winding induction motor;
a third bushing bar to electrically connect to both a second terminal of said first winding of said three-winding induction motor and to a second terminal of said second winding of said three-winding induction motor;
said first bushing bar also electrically connecting said first terminal of a third winding of said three-winding induction motor to said first wire;
means to electrically connect a first run capacitor between said first wire and said second terminal of said third bushing bar; and
a fourth bushing bar to electrically connect a second run capacitor between said second wire and a second terminal of said third winding of said three-winding induction motor.

2. A hermetic bushing as in claim 1, further including the external power supply.

3. A hermetic bushing as in claim 1, further including said three-winding induction motor having said first winding, said second winding, and said third winding, and each of the first, second and third windings having said respective first and second electrical terminals.

4. A hermetic bushing as in claim 1, further including a wall defining an internal space separate from an external space, the windings of said three-winding induction motor disposed within said internal space; and wherein said internal space is a closed space that includes refrigerant vapor.

5. A hermetic bushing as in claim 1, wherein the said induction motor includes three geometrically symmetrical windings.

6. A hermetic bushing as in claim 1, wherein the said induction motor includes three physically symmetrical windings.

7. A hermetic bushing as in claim 1, wherein a capacitance of the first capacitor is approximately twice as large as a capacitance of the second capacitor.

8. A hermetic bushing as in claim 1, wherein a magnitude of a voltage across each motor winding is between approximately 55% and 60% of a magnitude of a voltage from the first wire or electrical conductor of the power supply to the second wire or electrical conductor of the power supply.

9. A system comprising:
a four-conductor hermetic bushing including a first bushing conductor, a second bushing conductor, a third bushing conductor, and a fourth bushing conductor, said bushing adapted for electrical connection to an external three-winding electrical motor having first, second, and third motor windings and to a two-wire single-phase power supply including a first wire and a second wire in operation;

two capacitors including a first capacitor and a second capacitor;

wherein said first motor winding is electrically connected across said first and said second bushing conductors;

said first capacitor is electrically connected between said first bushing conductor and said second bushing conductor;

said second motor winding is electrically connected across said second and said third bushing conductors;

said second capacitor is electrically connected between said third bushing conductor and said fourth bushing conductor;

said third motor winding is electrically connected across said fourth bushing conductor and said first bushing conductor;

said first wire of said power supply is electrically connected to said first bushing conductor; and said second wire of said power supply is electrically connected to said third bushing conductor.

10. A system as in claim 9, further including said three-winding electrical motor having first, second, and third motor windings.

11. A system as in claim 9, further including means for electrically coupling to said two-wire single-phase power supply including to said first wire and to said second wire.

12. A system as in claim 9, further including said three-winding electrical motor having said first winding, said second winding, and said third winding, and each of the first, second and third windings having said respective first and second electrical terminals.

13. A system as in claim 10, further including a wall defining an internal space separate from an external space, the windings of said three-winding electrical motor disposed within said internal space and said internal space containing refrigerant vapor or gas.

14. A system as in claim 9, further including means for defining an internal space, wherein said internal space is a closed space substantially filled with refrigerant vapor or gas.

15. A systems as in claim 9, wherein the first and second capacitors each are continuous-duty capacitors.

16. A system as in claim 9, wherein a capacitance of the said first capacitor is approximately twice as great as a capacitance of the said second capacitor.

17. A system as in claim 9, wherein the motor windings are physically symmetrically wound.

18. A system as in claim 9, wherein the motor windings are geometrically symmetrically wound.

19. A system as in claim 9, wherein the first motor winding has a voltage phase which is approximately 120 degrees displaced from the second motor winding voltage phase, and wherein the voltage phase across the second motor winding is approximately 120 degrees displaced from the voltage phase across the third motor winding.

20. A system as in claim 9, wherein a magnitude of a voltage across each motor winding is between substantially 55% and 60% of a magnitude of a voltage from the first line wire or electrical conductor of the power supply to the second wire or electrical conductor of the power supply.

21. A hermetic bushing as in claim 1, including means for electrically coupling a first terminal of the third motor winding to said first wire.

22. A capacitor bank to connect an external two-wire single-phase power supply having a first wire and a second wire, to an external three-winding motor having first, second, and third motor two-terminal windings, the capacitor bank comprising:

a first capacitor; and a second capacitor;

said first and said second motor windings are adapted to be connected electrically in series between said first wire of said external power supply and said second wire of said external power supply;

said first capacitor is adapted to be connected between said first wire and a first terminal of the third motor winding;

means for electrically coupling a second terminal of said third motor winding to the said second wire;

means for electrically coupling a first terminal of said first motor winding to the said first wire;

means for electrically coupling a first terminal of said second motor winding to the said second wire;

means for electrically coupling a second terminal of said first winding to the second terminal of the said second winding;

said second capacitor is adapted to be connected between the second terminal of the second winding and the second wire of the power supply; and said three-winding motor being adapted for placement inside an hermetic enclosure interior space which also contains refrigerant vapor, and said capacitors being disposed in an external space outside of the said hermetic enclosure.

23. A capacitor bank as in claim 22, further including the hermetic enclosure.

24. A capacitor bank as in claim 22, further including the three-winding electric motor.

25. A capacitor bank as in claim 22, further including the power supply.

26. A capacitor bank as in claim 22, wherein said capacitors are continuous-duty rated.

27. A capacitor bank as in claim 22, wherein said capacitors are metallized polypropylene.

28. A capacitor bank as in claim 22, wherein said first capacitor is rated for at least 134 volts and said second capacitor is rated for at least substantially 267 volts when the said power supply is substantially 230 volts 60 Hertz single-phase alternating voltage.

29. A three-winding motor having first, second, and third motor two-terminal windings, comprising:

a first capacitor; and a second capacitor;

said first and said second motor windings being adapted to be connected electrically in series between said first wire of an external power supply and said second wire of said external power supply;

means for electrically coupling a first terminal of said first motor winding to said first wire;

means for electrically coupling a first terminal of said second motor winding to said second wire;

means for electrically coupling a second terminal of said first winding to a second terminal of said second winding;

means for electrically coupling a first terminal of said third motor winding to said first wire;

means for electrically coupling a first terminal of said first motor winding to said first wire;

means for electrically coupling a first terminal of said second motor winding to said second wire; means for electrically coupling a second terminal of said first winding to a second terminal of said second winding;

said first capacitor being adapted to be connected between said first wire and a second terminal of said first motor winding;

said second capacitor being adapted to be connected between the second terminal of the third motor winding and the second wire of the power supply; and said three-winding motor being adapted for placement inside an hermetic enclosure which also contains refrigerant vapor, and said capacitors being disposed outside of said hermetic enclosure.

30. A refrigeration or air-conditioning unit comprising:

a refrigerant compressor having a rotatable compressor shaft;

a three-winding electrical induction motor having a motor shaft and mechanically coupled with said compressor shaft for driving said refrigerant compressor;

an input power port having a first input terminal for coupling with and receiving power from an external power supply single-phase electrical first wire line and a second input terminal for coupling with and receiving power from an external power supply single-phase electrical second wire line;

a four-terminal hermetic bushing for coupling with said single-phase first and second wire lines and said three-winding motor; and first and second motor-run capacitors coupled with the hermetic bushing and with at least one of the input power port line wires.

31. A circuit for use with an air-conditioning compressor, comprising:

a first power-supply terminal and a second power-supply terminal for coupling with an external two-wire single-phase power supply, the first power-supply terminal coupled to a first wire or electrical conductor and the second power-supply terminal coupled to a second wire or electrical conductor;

a first connector node to electrically connect said first wire of said power supply to a first terminal of a first winding of an external three-winding induction motor;

a second connector node to electrically connect said second wire of said power supply to a first terminal of a second winding of said three-winding induction motor;

a third connector node to electrically connect said first wire to both a second terminal of said first winding of said three-winding induction motor and to a second terminal of said second winding of said three-winding induction motor;

said first connector node also electrically connecting said first terminal of a third winding of said three-winding induction motor to said first wire;

an electrically conductive member to electrically connect a first run capacitor between said first wire and said second terminal of said first winding of said three-winding induction motor; and a fourth connector node to electrically connect a second run capacitor between said second wire and a second terminal of said third winding of said three-winding induction motor.

* * * * *

UNITED STATES PATENT AND TRADEMARK OFFICE
CERTIFICATE OF CORRECTION

| | | |
|---|---|---|
| PATENT NO. | : 8,028,540 B2 | Page 1 of 1 |
| APPLICATION NO. | : 12/042255 | |
| DATED | : October 4, 2011 | |
| INVENTOR(S) | : Otto J. M. Smith | |

It is certified that error appears in the above-identified patent and that said Letters Patent is hereby corrected as shown below:

Column 11, line 57, claim 20, delete "line"

Signed and Sealed this
Sixth Day of March, 2012

David J. Kappos
*Director of the United States Patent and Trademark Office*